(12) United States Patent
Kies (10) Patent No.: US 8,406,797 B2
(45) Date of Patent: Mar. 26, 2013

(54) SYSTEM AND METHOD FOR TRANSMITTING AND PLAYING ALERT TONES IN A PUSH-TO-TALK SYSTEM

(75) Inventor: Jonathan K. Kies, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1712 days.

(21) Appl. No.: 10/924,481

(22) Filed: Aug. 24, 2004

(65) Prior Publication Data

US 2006/0046756 A1 Mar. 2, 2006

(51) Int. Cl.
*H04B 7/00* (2006.01)

(52) U.S. Cl. ........ 455/518; 455/517; 455/519; 455/520; 455/521; 709/204; 709/205; 709/206; 709/207; 379/164; 379/179; 379/252; 379/373.01; 379/373.02

(58) Field of Classification Search .................. 455/567, 455/418, 419, 564, 516–521, 526; 379/373, 379/374, 375; 715/727; 709/204–207
See application file for complete search history.

(56) References Cited

U.S. PATENT DOCUMENTS

| | | | | |
|---|---|---|---|---|
| 5,220,599 | A * | 6/1993 | Sasano et al. | 379/142.06 |
| 5,307,059 | A * | 4/1994 | Connary et al. | 340/7.62 |
| 5,940,775 | A * | 8/1999 | Kim | 455/567 |
| 6,070,053 | A * | 5/2000 | Yamashita | 340/7.58 |
| 6,314,306 | B1 * | 11/2001 | Harris | 455/566 |
| 6,418,330 | B1 * | 7/2002 | Lee | 455/567 |
| 7,013,154 | B2 * | 3/2006 | Nowlan | 455/466 |
| 2002/0115456 | A1 * | 8/2002 | Narinen et al. | 455/466 |
| 2002/0197994 | A1 | 12/2002 | Harris et al. | |
| 2004/0077358 | A1 | 4/2004 | Bennett et al. | 455/455 |
| 2004/0092295 | A1 * | 5/2004 | Yamada | 455/567 |
| 2004/0103158 | A1 | 5/2004 | Vella et al. | 709/206 |
| 2004/0119685 | A1 | 6/2004 | Harries et al. | 345/156 |

(Continued)

FOREIGN PATENT DOCUMENTS

| | | |
|---|---|---|
| JP | 8317454 A | 11/1996 |
| JP | 11136393 A | 5/1999 |

(Continued)

OTHER PUBLICATIONS

Alinco, et al., "UHF-FM Transceiver DJ-S446 Instruction Manual", Dec. 31, 2001, XP55012110, Internet Retrieved from the Internet: URL: http://www.alinco.com/pdf.files/Instruction/Handheld/djs446insweb.pdf [retrieved on Nov. 15, 2011].

(Continued)

*Primary Examiner* — Fayyaz Alam (74) *Attorney, Agent, or Firm* — Raphael Freiwirth (57) ABSTRACT

A system and method for transmitting alert tone information among communicating wireless devices to identify a speaker in a push-to-talk system. A predefined set of alert tones is stored in a wireless device, and when a user presses a push-to-talk button on the wireless device, the wireless device displays a list of predefined alert tones to the user to select. After the user selects an alert tone, the wireless device transmits an alert tone code associated with the selected alert tone to a server for relaying to every wireless device in a push-to-talk communication group. When a receiving wireless device receives the alert tone code, it retrieves an alert tone corresponding to the alert tone code from the predefined set and plays the alert tone to the user of the wireless device.

16 Claims, 7 Drawing Sheets

U.S. PATENT DOCUMENTS

| | | | |
|---|---|---|---|
| 2004/0121818 A1* | 6/2004 | Paakkonen | 455/567 |
| 2004/0125802 A1 | 7/2004 | Lillie et al. | |
| 2004/0127233 A1 | 7/2004 | Harris et al. | |
| 2005/0107128 A1* | 5/2005 | Deeds | 455/567 |

FOREIGN PATENT DOCUMENTS

| | | |
|---|---|---|
| JP | 2002009844 | 1/2002 |
| JP | 2003092776 A | 3/2003 |
| WO | WO02085051 A1 | 10/2002 |

OTHER PUBLICATIONS

International Search Report and Written Opinion—PCT/US2005/030063, International Searching Authority—US, Feb. 7, 2006.

Supplementary Partial European Search Report—EP05790801—Search Authority—Munich—Nov. 18, 2011.

\* cited by examiner

SYSTEM AND METHOD FOR TRANSMITTING AND PLAYING ALERT TONES IN A PUSH-TO-TALK SYSTEM

BACKGROUND OF THE INVENTION

1. Field of the Invention

The present invention generally relates to wireless telecommunications, and more specifically, relates to a system and method for transmitting alert tones in a push-to-talk system on a wireless network to identify speakers in group communications.

2. Description of the Related Art

Technology advancement has made mobile telephones or wireless communications devices cheap and affordable to almost everyone. As the wireless telephones are manufactured with greater processing ability and storage, they also become more versatile and incorporate many features including the direct radio communication capability between two or more individual handsets. This direct radio communication capability is commonly known as the push-to-talk (PTT) or "walkie-talkie" feature that allows a user with one handset to communicate with a predefined set of members of a group without dialing a destination telephone number.

In a PTT system, a handset uses one single frequency for both upward and downward communications with a remote server, while in a normal wireless communication a wireless telephone uses two frequencies for communicating with the server, one for upward and one for downward communications. The PTT system requires the person who is speaking to press a button while talking and then release it when he is done. Any listener in the group can then press their button to respond. In this manner, the system can determine which direction the signal should be traveling in. When a user makes a call to a receiving party or a group of receiving parties using the PTT system, the user's handset first makes a request to a remote server. The remote server verifies that no other party is using the communication channel and the channel is available then assigns the channel to the user. The user's message is received by the server and the server duplicates the message for each and every receiving party. After the message is transmitted to every receiving party, the channel is released and ready for use by other parties.

The PTT system relies on cellular technology to connect to the recipient devices. Conversely, a normal "walkie-talkie" style two-way radio will only operate if the radios are within a certain distance of each other. Systems using the PTT feature can communicate anywhere within a service area specified by its service provider, typically a large urban area or even nationally.

Generally, in a communication through the PTT feature one user broadcasts his messages to a plurality of members in his PTT communication group and the message is broadcasted without any identification of the speaker unless the user identifies himself every time he sends an audio message to his PTT communication group. The listening members in the PTT communication group have to identify the speaker by his voice or manner of speaking and in a large PTT group confusion often occurs because of misidentification of the speaker.

SUMMARY OF THE INVENTION

The system and method according to the invention enables transmission and display of alert tone information among wireless devices in a push-to-talk system. A predefined set of user alert tones is stored in a wireless device, and each user in a PTT group is assigned to a unique alert tone. When a user presses a push-to-talk button on the wireless device, the wireless device transmits a predefined alert tone information along with audio information to every wireless device in a push-to-talk communication group. When a receiving wireless device receives the predefined alert tone information, it plays an alert tone identified by the predefined alert tone information to identify the sender of the audio message to the receiving user. Alternatively, a user may select an alert tone each time before sending an audio message to the PTT group and the alert tone may reflect the nature of the audio message.

In one embodiment, the invention is a method for transmitting alert tone information between a wireless device and a server in a push-to-talk system on a wireless telecommunication network. The method includes the steps of displaying a predefined set of alert tones to a user of the wireless device, wherein the user selects an alert tone for transmitting to the server, receiving an indication of a selected alert tone at the wireless device, wherein the indication of the selected alert tone received from the user will be transmitted from the wireless device to the server via the push-to-talk system, selecting at the wireless device an alert tone code corresponding to the indication of the selected alert tone, and transmitting the alert tone code from the wireless device to the server via a push-to-talk communication channel. The predefined set of alert tones resides on the wireless device and each alert tone in the predefined set is identified by an alert tone code.

In another embodiment, the invention is a method for identifying a caller in a push-to-talk communication system, wherein the caller is identified by a unique alert tone. The method includes the steps of receiving a push-to-talk request at the wireless device, receiving an alert tone code at the wireless device, wherein the alert tone code identifies an alert tone associated with the caller, selecting the alert tone corresponding to the alert tone code from a predefined set of alert tones stored in the wireless device, wherein each alert tone in the predefined set of alert tones is associated with a unique alert tone code, and playing the alert tone to a user of the wireless device. Both the push-to-talk request and the alert tone code are received from the server through a push-to-talk communication channel.

In yet another embodiment, the invention is a method for transmitting alert tone information in a remote wireless telecommunication device received from a server in a push-to-talk system. The method includes the steps of receiving at the server a request for a push-to-talk session, receiving at the server an alert tone code corresponding to an alert tone, determining a group of intended receiving wireless telecommunication devices for the push-to-talk session, sending an indication of the push-to-talk session to each intended receiving wireless telecommunication device in the group, and sending the alert tone code through the push-to-talk communication channel to each intended receiving wireless telecommunication device in the group. The alert tone code is received from the wireless telecommunication device through a push-to-talk communication channel.

In yet another embodiment, the invention also includes an apparatus for enabling transmission and playing of alert tones on a wireless telecommunication device in a push-to-talk system. The apparatus includes a transceiver for transmitting and receiving push-to-talk communications from a remote server, a storage unit for receiving a predefined set of alert tones from the remote server, wherein the predefined set is identified by an alert tone set code and includes a plurality of alert tones, a display unit for displaying alert tones in the predefined set of to a user, a user interface unit for receiving an indication of a selected alert tone from the user, a push-totalk interface for receiving a push-to-talk request from the user, and a controller for selecting the alert tone code corresponding to the indication and transmitting the alert tone code and the push-to-talk request to the remote server. Each alert tone in the predefined set is identified by an alert tone code.

In yet another embodiment, the invention further includes a system for transmitting an alert tone information and identifying a caller by an alert tone during a push-to-talk communication session in a wireless communication network. The system includes a server in communication with the wireless communication network, and a plurality of wireless communication devices capable of communicating with the server through the wireless communication network, each wireless communication device having a predefined set of alert tones, each alert tone in the predefined set being identified by an alert tone code, wherein a first wireless communication device transmits an alert tone code with a push-to-talk communication to the server, the server transmits the alert tone code with the push-to-talk communication to a second wireless communication device, and the second wireless communication device receives the alert tone code with the push-to-talk communication and plays an alert tone identified by the alert tone code. The server includes information on at least one push-to-talk communication group with a plurality of members.

The present system and methods are therefore advantageous as they provide a group of wireless communication devices the ability to identify the sender or the nature of an audio message. The availability of a predefined set of alert tones provides a wide range of tones for the user to select from. Further, the conveyance of shorter alert tone codes allows the conservation of expensive bandwidth.

Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "wireless communications device," "wireless handset," "handheld device," and "handset" are used interchangeably, and "fetch" and "download" are used interchangeably, the term "application" as used herein is intended to encompass executable and nonexecutable software files, raw data, aggregated data, patches, and other code segments. Further, like numerals refer to like elements throughout the several views, and the articles "a" and "the" includes plural references, unless otherwise specified in the description.

In overview, the system and method for transmitting and playing alert tone information in a push-to-talk system enable a receiver to identify the sender or the nature of an audio message through the alert tone played before the audio message. The alert tones are pre-installed in each handset of the communication group and each alert tone is associated with a predefined alert tone code. The user selects an alert tone when activating the PTT feature and the alert tone code associated with the selected alert tone is sent to the members of the communication group. When the wireless handset of a member receives the alert tone code, the wireless handset selects an associated alert tone and plays the alert tone to the receiving member. The use of the system and method therefore enables transmission of alert tone information without increasing significantly traffic of a wireless communication network.

Figure 1:
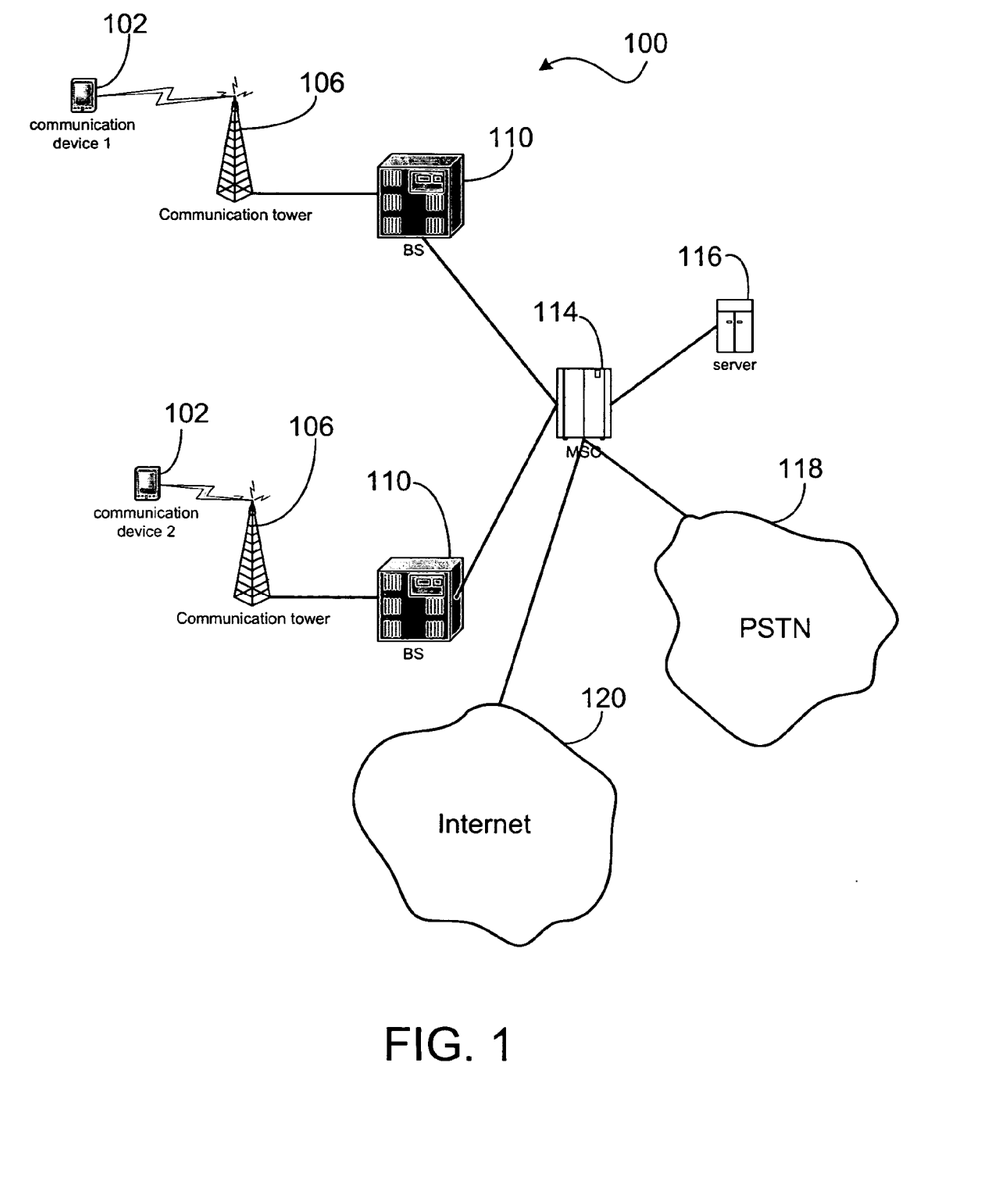
FIG. 1 is a wireless network architecture that supports the transmission of alert tone information in a push-to-talk system.

FIG. 1 depicts a communication network 100 used according to the present invention. The communication network 100 includes one or more communication towers 106, each connected to a base station (BS) 110 and serving users with communication device 102. The communication device 102 can be cellular telephones, pagers, personal digital assistants (PDAs), laptop computers, or other hand-held, stationary, or portable communication devices that supports push-to-talk (PTT) communications. The commands and data input by each user are transmitted as digital data to a communication tower 106. The communication between a user using a communication device 102 and the communication tower 106 can be based on different technologies, such code division multiplexed access (CDMA), time division multiplexed access (TDMA), frequency division multiplexed access (FDMA), the global system for mobile communications (GSM), or other protocols that may be used in a wireless communications network or a data communications network. The data from each user is sent from the communication tower 106 to a base station (BS) 110, and forwarded to a mobile switching center (MSC) 114, which may be connected to a public switched telephone network (PSTN) 118 and the Internet 120. The MSC 114 may be connected to a server 116 that supports the PTT feature in the communications network 100. The server 116 includes an application that supports the PTT feature besides storing a table that lists members of each communication group. Optionally, the server 116 may be part of the MSC 114.

Figure 2:
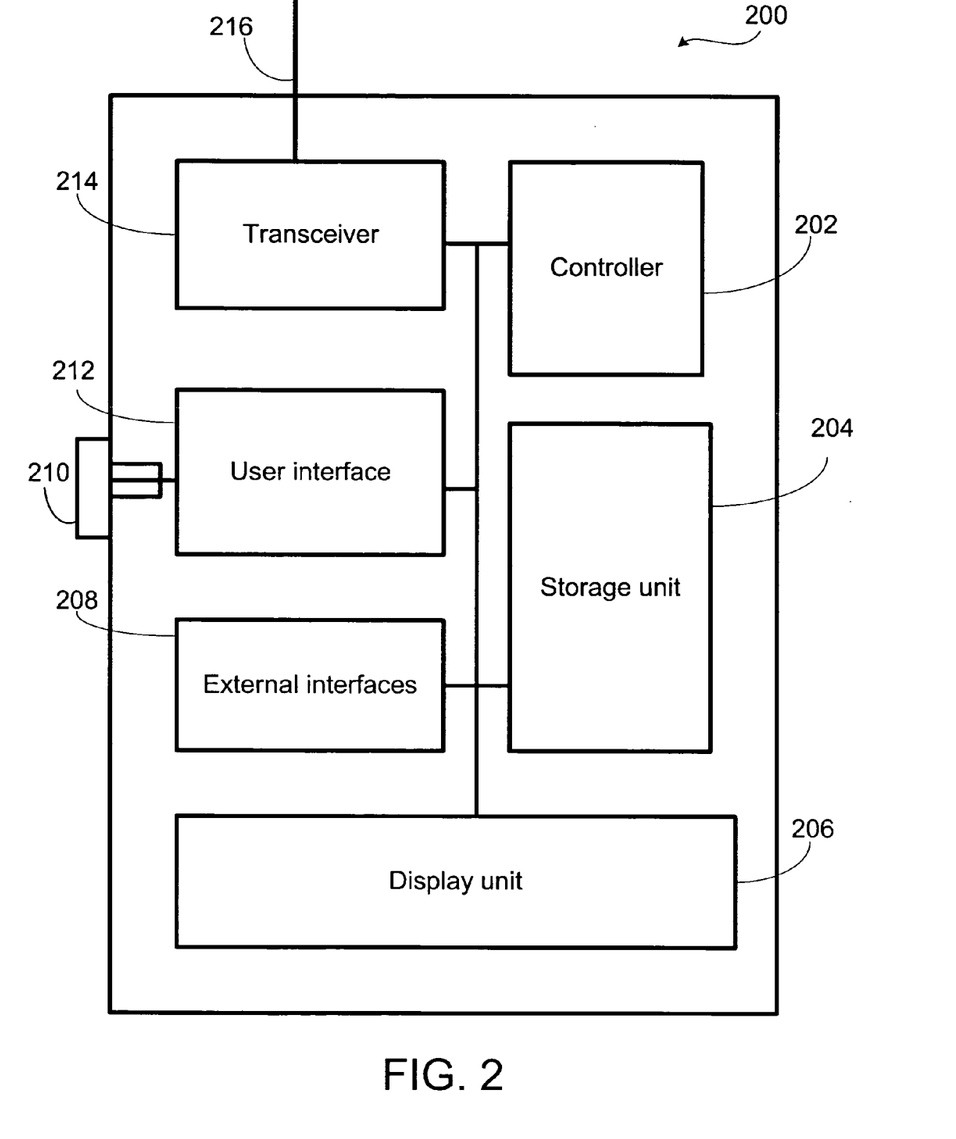
FIG. 2 is a block diagram of a wireless device that supports the transmission of alert tone information in a push-to-talk system.

FIG. 2 illustrates a block diagram 200 of a wireless handset 102. The wireless handset 102 includes a controller 202, a storage unit 204, a display unit 206, an external interface unit 208, a user interface unit 212, a push-to-talk activation unit 210, a transceiver 214, and an antenna 216. The controller 202 can be hardware, software, or a combination thereof. The storage unit 204 may store a set of predefined alert tones, and each alert tone is identified by an alert tone code. Alternatively, the set of predefined alert tones may be stored at the remote server 116. The display unit 206 may display graphical images or other digital information to the user. The external interface unit 208 controls hardware, such as speaker, microphone, and display unit, used for communication with the user. The user interface unit 212 controls hardware, such as keypad and push-to-talk activation unit 210. The transceiver 214 transmits and receives radio signals to and from a communication tower 106. The controller 202 interprets commands and data received from the user and the communication network 100.

Generally, the alert tones are defined and provided by the service provider. The alert tones may include standard machine tones or "musical" tones. Alternatively, the alert tones may be defined and/or created by members of the communication group and be self-identifying. The alert tones may be uploaded to the server 116 by a user using a computing device that accesses the server 116 via the Internet 120. Each alert tone is assigned an alert tone code and associated with an alert tone set. Each alert tone set is identified by an alert tone set code. The alert tones on a wireless device must be kept updated and synchronized with other wireless devices in the communication group. The alert tones can be assigned for one or more group communications, i.e., an alert tone can be for a current PTT session, or for all PPT group communications.

Figure 3:
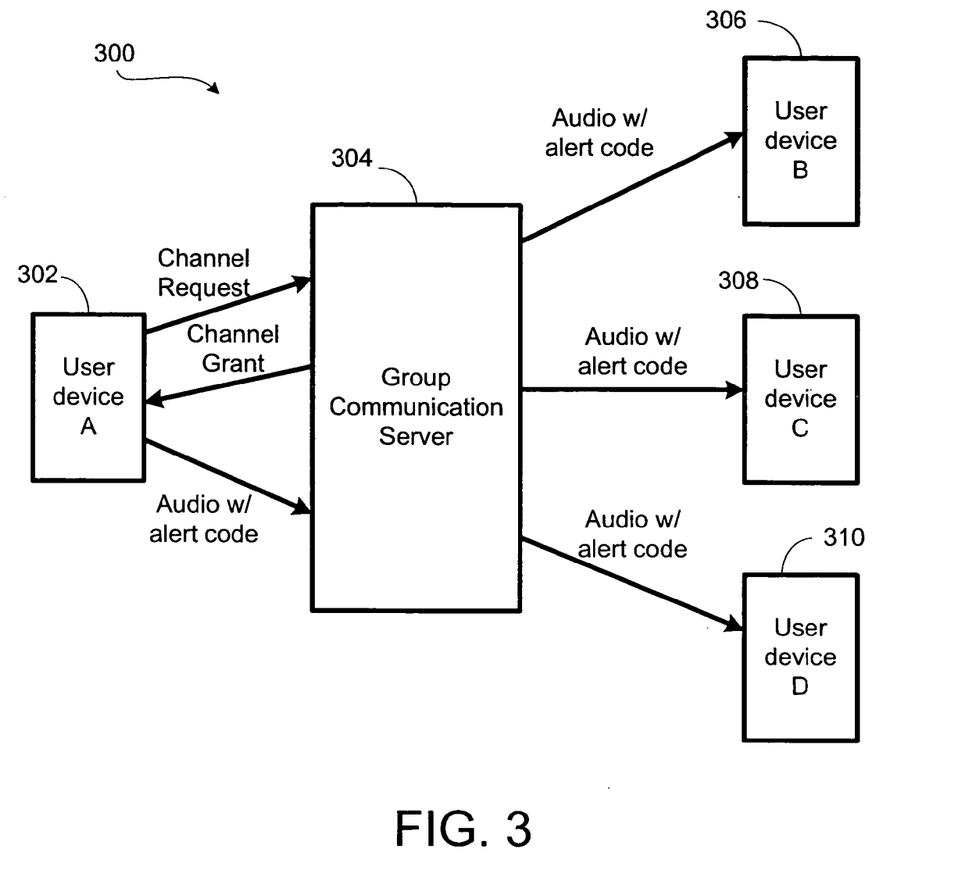
FIG. 3 is a diagram representing interactions between a server and remote wireless devices.

FIG. 3 is a diagram 300 representing interactions between the server (also known as group communication server) and user devices during a PTT communication process. A communication does not occur between an initiating user device 302 and a server 304 until a user activates a PTT button and selects an alert tone to be sent with an audio message. After the user selects an alert tone, the initiating user device 302 sends a PTT communication channel request to the server 304. Upon receiving the PTT communication channel request, the server 304 checks the availability of the PTT communication channel, and grants the PTT communication channel to the initiating user device 302 if the PTT communication channel is available. After the use of the PTT communication channel is granted to the initiating user device 302, and the initiating user device 302 receives user audio and retrieves an alert tone code associated with the selected alert tone. Both the user audio and the alert tone code are transmitted to the server 304. Upon receiving the user audio and the alert tone code, the server 304 identifies the members 306-310 of the PTT communication group that the initiating user device 302 wants to send the audio message. The server 304 also replicates the audio message and image code and sends them to each member 306-310 of the PTT communication group. When the user audio and alert tone code are received by each member 306-310 of the PTT communication group, each member device, before playing the user audio, retrieves an alert tone identified by the alert tone code and plays the alert tone to the receiving member.

Figure 4:
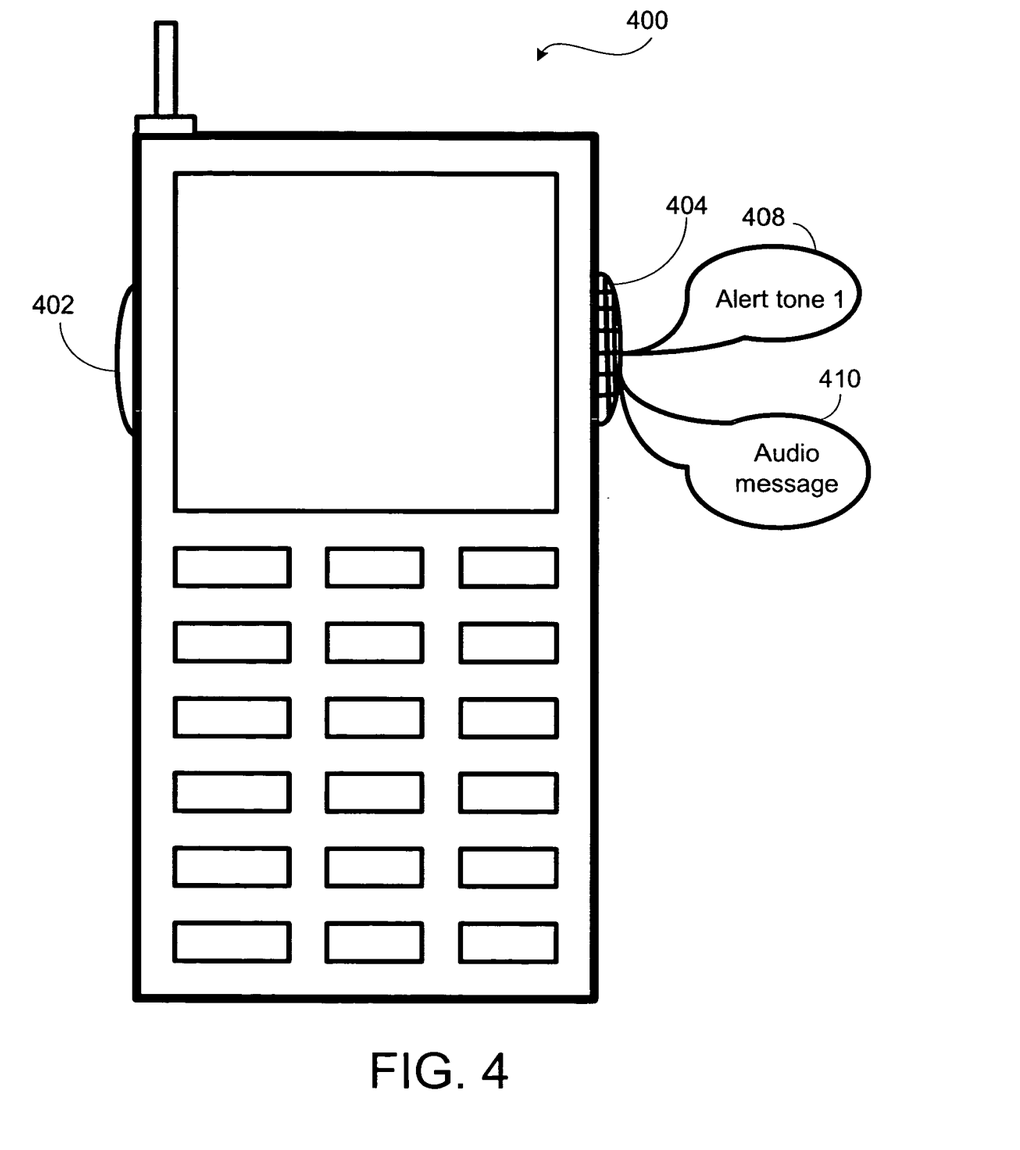
FIG. 4 is an illustration of a wireless device playing an audio message.

FIG. 4 illustrates a wireless communication device 400 playing an alert tone 408 and audio message 410 on a speaker 404. A user activates a push-to-talk communication by pushing a push-to-talk button 402, and the push-to-talk communication is then sent to a remote server. When the receiving device 400 receives an alert tone code during the push-to-talk communication from the remote server, it retrieves an alert tone associated with the alert tone code and plays it on the speaker 404. Because of uniqueness of each alert tone, the receiving member can either identify through the alert tone the identity of the sender of the audio message or the nature of the audio message.

Figure 5:
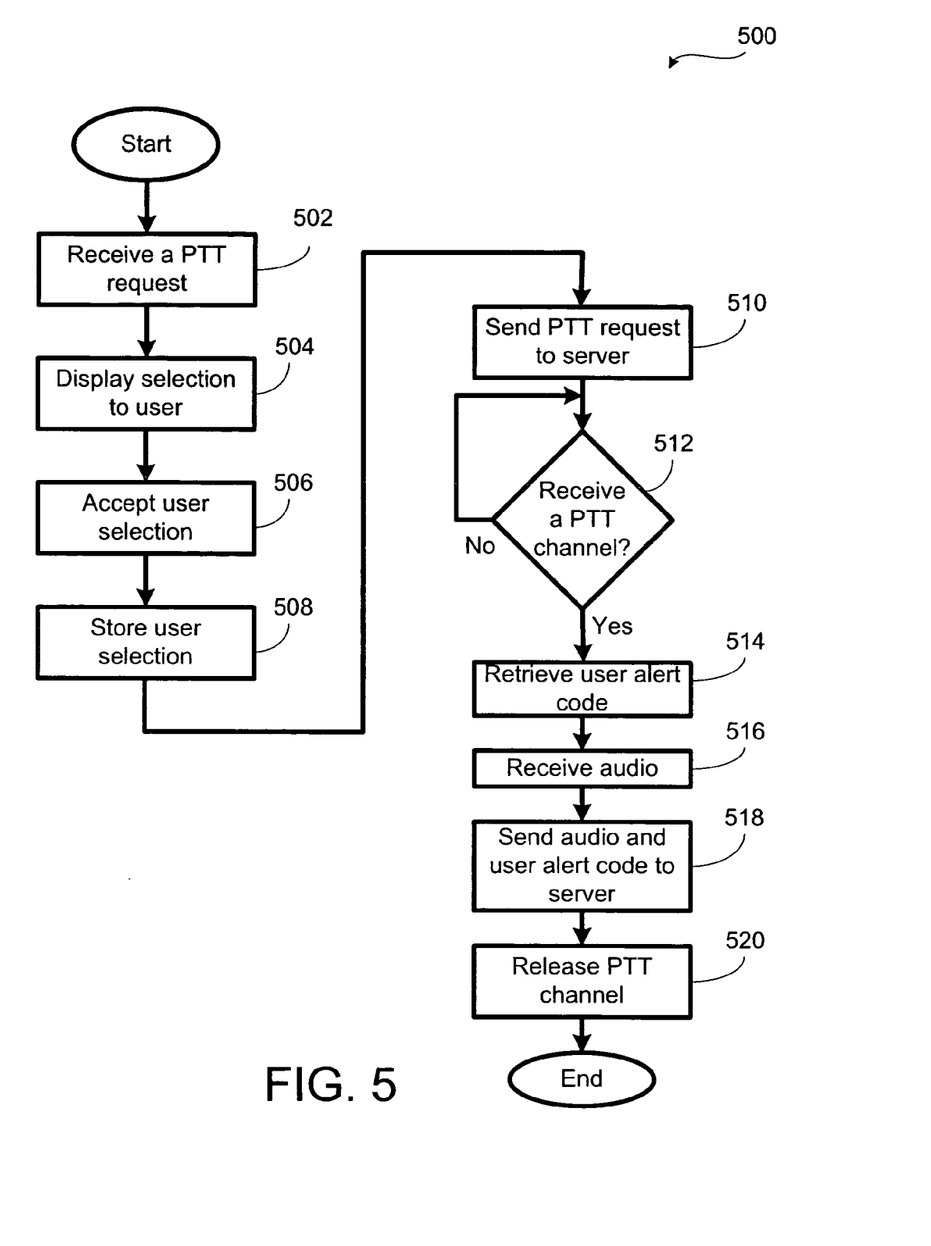
FIG. 5 is a flow chart for transmitting alert tone information in a push-to-talk system.

FIG. 5 is a flow chart for an alert tone information transmitting process 500. When a user wants to communicate with other members of his or her communication group, the user activates a PTT activation unit 210. The wireless handset 102 receives the PTT activation request, step 502, and displays a predefined set of alert tones to the user, step 504. The alert tones may be listed by their numbers or by their natures. For example, the alert tones in a predefined set may be listed numerically. In another example, the alert tones in another predefined set may be listed by their natures, such as "classical tone," "rock tone," "country tone," etc. The user may select an alert code to be transmitted along with his audio message, step 506. After the user makes a selection, the wireless handset stores the selection, step 508, and requests a PTT connection, step 510. The PTT connection request is sent to the server 116 and the wireless handset 102 awaits the PTT communication channel. If the PTT communication channel is available, the wireless handset 102 retrieves the user alert tone information (also known as alert code), step 514, and receives audio from the user, step 516. The wireless device 102 then sends the select alert code along with the audio communication to the server 116, step 518. After transmitting the audio message, the wireless handset 102 releases the PTT channel, step 520, so other members of the PTT communication group may use it.

Figure 6:
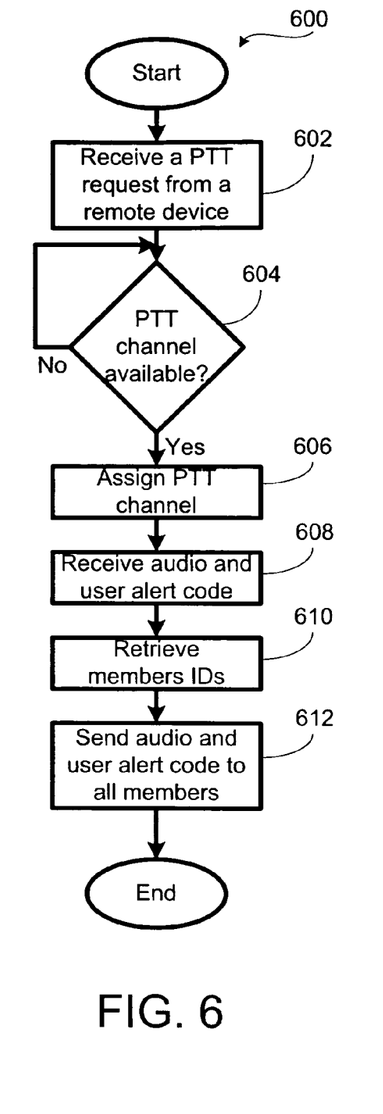
FIG. 6 is a flow chart for a server process for transmitting an audio message in a push-to-talk system.

FIG. 6 is a flow chart for a server process 600 for transmitting alert tone information. The server 116 received a PTT request from a wireless device, step 602, and checks whether a PTT channel is available, step 604. If the PTT channel is available, the server 116 assigns the PTT channel to the requesting wireless device, step 606. After assigning the PTT channel, the server 116 receives an audio message and an alert code from the wireless device, step 608. The server 116 identifies the members of the PTT communication group by retrieving their member identifications, step 610, and proceeds to send the audio message along with the alert code to all the members, step 612.

Figure 7:
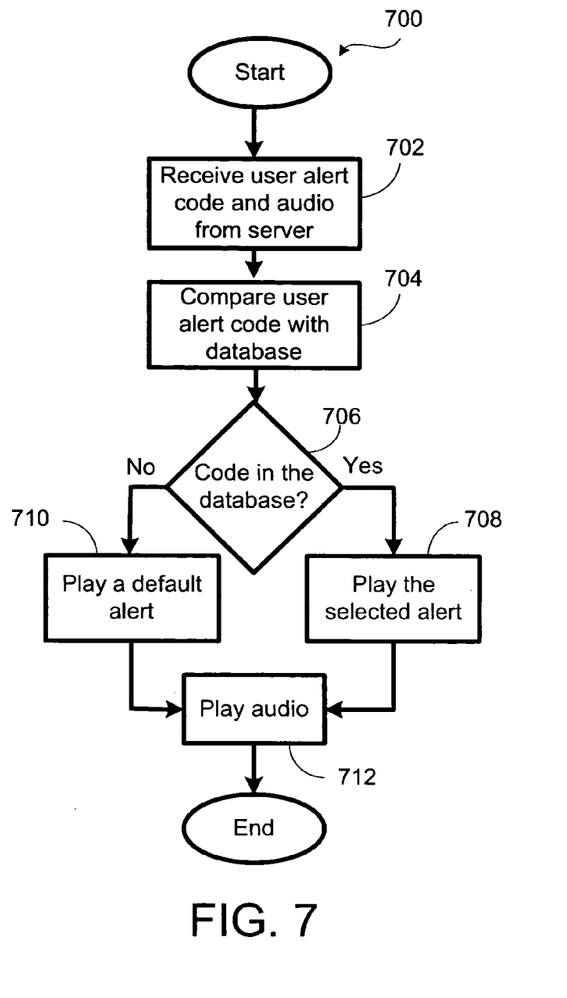
FIG. 7 is a flow chart for playing an alert tone and audio message in a wireless device.

FIG. 7 is a flow chart for an alert tone playing process 700. When a wireless handset 102 receives a PTT communication with an alert code, step 702, the handset 102 compares the graphics code with a predefined graphics database, step 704. The handset 102 checks whether the received alert code is listed in the database, step 706. If the received graphics code is in the database, the wireless handset 102 plays the corresponding alert tone in through the speaker unit 404, step 708. If the received alert code is not in the database, the wireless handset 102 plays a default alert tone or an error tone at the speaker unit 404, step 710. After playing the alert tone, the wireless device 102 plays the audio message, step 712.

Figure 8:
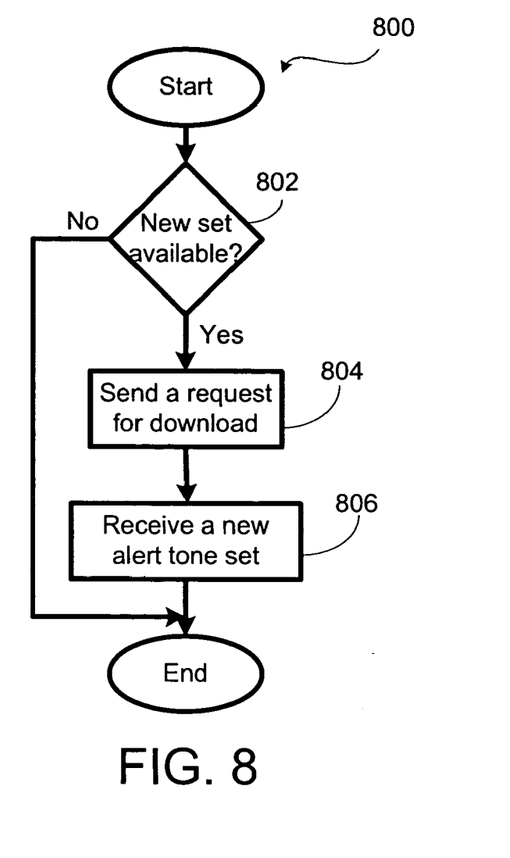
FIG. 8 is a flow chart for updating the alert tone set in a wireless device.

FIG. 8 is a flow chart for an alert tone update process 800. When a wireless handset 102 is powered up, the wireless handset 102 checks whether there is a new set of alert tones for the communication group to which it belongs, step 802. The wireless handset 102 compares its alert tone set code to the alert tone set code received from the server 116. If there is a new alert tone set, the wireless handset 102 sends a download request to the server 116, step 804. The wireless handset 102 will then receive the new alert tones from the server 116, step 806. The server 116 can minimize the use of bandwidth by sending only new alert tones to the wireless handset 102 instead of sending the entire set of alert tones.

Figure 9:
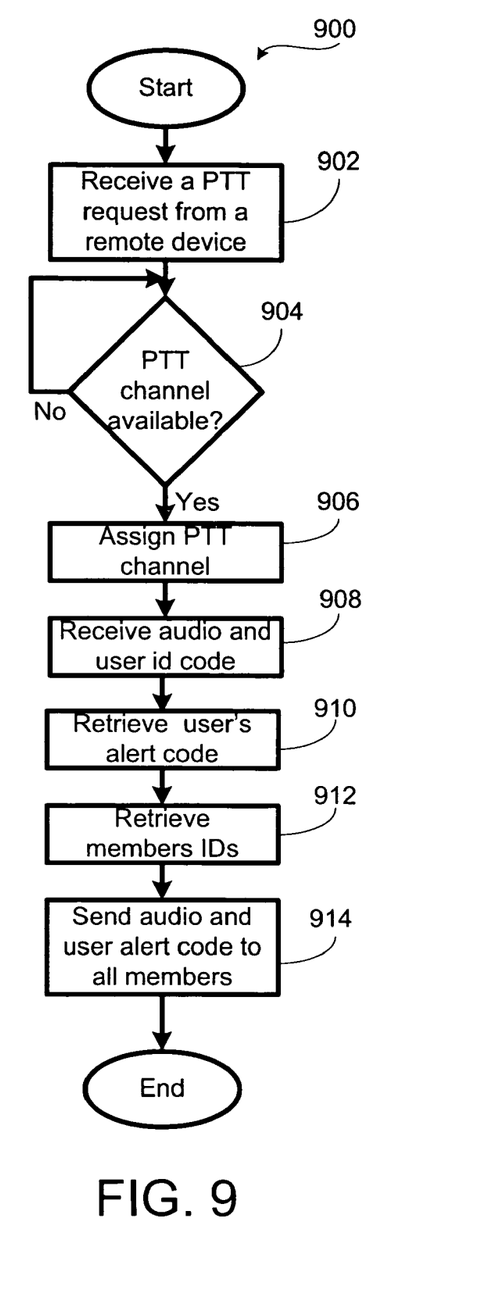
FIG. 9 is a flow chart for an alternative server process for transmitting an audio message in a push-to-talk system.

In an alternative embodiment, each user in a PTT communication group may be pre-assigned to an alert tone. FIG. 9 is a flow chart for an alternative server process 900 for transmitting alert tone information. The server 116 received a PTT request from a wireless device, step 902, and checks whether a PTT channel is available, step 904. If the PTT channel is available, the server 116 assigns the PTT channel to the requesting wireless device, step 906. After assigning the PTT channel, the server 116 receives an audio message and a user identification code from the wireless device 102, step 908. The server 116 identifies the user and retrieves an alert code previously assigned to the user, step 910. The server 116 also identifies the members of the PTT communication group by retrieving their member identifications, step 912, and proceeds to send the audio message along with the alert code to all the members, step 914.

The following is a description of one use scenario according to one embodiment of the invention. When a user wants to communicate with a receiving party through the PTT feature, the user presses the PTT activation unit 210 on his wireless handset 102. The controller 202 interprets the pressing of the PTT activation unit 210 and displays a menu with the predefined set of alert tones to the user. The user may select a predefined alert tone to be sent with the PTT communications to the receiving members. The controller 202 receives and stores the user's selection of predefined alert tone, then sends a PTT request through the transceiver 214 and the antenna 216 to a remote server 116. The PTT request travels as radio wave from the wireless handset 102 to a communication tower 106, where the PTT request is forwarded to the remote server 116. The link between the wireless handset 102 and the communication tower 106 is over a half-duplex communication channel, which can be either a voice channel or a data channel. The PTT communication may be conducted over a dedicated radio network. Alternatively, the PTT communication may be conducted over a wireless communication network that supports normal wireless communications.

After receiving the PTT request from a subscribing wireless handset, the server 116 determines the availability of the communication channel. If the communication channel is available, the server 116 grants the channel to the requesting wireless handset. After being granted the communication channel, the requesting wireless handset 102 retrieves an alert code associated with the user-selected alert tone and transmits it with audio communication to the server 116. Transmitting an alert code associated with an alert tone instead of the actual alert tone minimizes use of the bandwidth. The alert tones are transmitted to each handset only once when the user updates the alert tone set in the wireless handset 102.

The server 116 receives the audio communication along with the alert code and identifies members in the PTT communication group. The server 116 replicates the audio communication and the alert code and sends one copy of the audio communication and the alert code to each member in the PTT communication group. A user may belong to more than one PTT communication group and may be able to send a PTT communication to any group the user is part of. The PTT request and PTT communication include a group identification code that identifies the targeted PTT communication group. The user may be pre-assigned a different alert tone for each group and the user will then be identified by different alert tones in different PTT communication groups.

The following is another use scenario for the present invention. A user may belongs to a PTT communication group that includes his family members and closed friends and the PTT communication group may have a predefined set of alert tones that includes different musical tones. The system may assign a rock musical tone to his son, a romantic tone to his wife, and a classical tone to himself. When his son sends an audio message to the family communication group, the audio message is sent with his identification. The server will automatically attach an alert code assigned to him and sends it with the audio message to his parents. When an audio message is received by the user and the audio message is preceded by a rock musical tone, the user knows immediately that the audio message is from his son and not from his wife.

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 5-9, the method may be implemented, for example, by operating portion(s) of the wireless network, such as a wireless communications device or the server, to execute a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A method for transmitting alert tone information between a wireless device and a server in a push-to-talk system on a wireless telecommunication network, comprising the steps of:
   displaying a predefined set of alert tones at the wireless device, the predefined set resident on the wireless device and each alert tone in the predefined set being identified by an alert tone code;
   receiving an indication of a selected alert tone at the wireless device, the selected alert tone associated with a user of the wireless device, wherein the indication of the selected alert tone will be transmitted from the wireless device to the server via the push-to-talk system;
   selecting at the wireless device the alert tone code corresponding to the indication of the selected alert tone;
   transmitting the alert tone code along with a first audio message from the wireless device to the server via a push-to-talk communication channel;
   storing an association of the alert tone code and the wireless device in memory at the wireless device where the selected alert tone is selected;
   retrieving the stored association from the memory for use with at least one subsequent transmission; and
   transmitting the alert tone code along with a second audio message from the wireless device to the server via the push-to-talk communication channel based on the retrieved association.

2. The method of claim 1, further comprising the steps of:
   receiving an activation request for a push-to-talk session of the wireless device; and
   transmitting the activation request from the wireless device to the server.

3. The method of claim 2, further comprising the step of receiving from the server an indication of availability of the push-to-talk communication channel.

4. A method for transmitting alert tone information of a remote wireless telecommunication device by a server in a push-to-talk system, comprising the steps of:
receiving at the server a request for a push-to-talk session through a push-to-talk communication channel;
assigning at the server an alert tone code corresponding to an alert tone, the alert tone code identifying the alert tone selected by the server to be associated with a sender of the request;
determining a group of intended receiving wireless telecommunication devices for the push-to-talk session;
sending an indication of the push-to-talk session to each intended receiving wireless telecommunication device in the group; and
sending the alert tone code through the push-to-talk communication channel to each intended receiving wireless telecommunication device in the group.

5. The method of claim 4, further comprising the steps of:
determining at the server an availability of the push-to-talk communication channel; and
if the push-to-talk communication channel is available, granting the push-to-talk communication channel to the remote wireless telecommunication device.

6. The method of claim 4, further comprising the steps of:
receiving an alert tone at the server;
storing the alert tone in an alert tone database in the server; and
assigning a new alert tone set identification code to the alert tone database.

7. An apparatus for enabling transmission and playing of alert tones on a wireless telecommunication device in a push-to-talk system, comprising:
a transceiver for transmitting and receiving push-to-talk communications from a remote server;
a storage unit for receiving a predefined set of alert tones from the remote server, wherein the predefined set is identified by an alert tone set code and includes a plurality of alert tones, each alert tone identified by an alert tone code;
a display unit for displaying alert tones in the predefined set;
an interface unit for receiving an indication of a selected alert tone, the selected alert tone associated with a user of the apparatus;
a push-to-talk interface for receiving a push-to-talk request; and
a controller for selecting the alert tone code corresponding to the indication, transmitting the alert tone code along with a first audio message and the push-to-talk request to the remote server, storing an association of the alert tone code and the apparatus in memory, retrieving the stored association from memory for use with at least one subsequent transmission, and transmitting the alert tone code along with a second audio message from the wireless device to the remote server based on the retrieved association.

8. An apparatus for enabling transmission and playing of alert tones on a wireless telecommunication device during a push-to-talk session, comprising:
means for transmitting and receiving push-to-talk communications from a remote server;
means for receiving a predefined set of alert tones from the remote server, wherein the predefined set is identified by an alert tone set code and includes a plurality of alert tones, each alert tone identified by an alert tone code;
means for displaying alert tones in the predefined set;
means for receiving an indication of a selected alert tone, the selected alert tone associated with of a user of the apparatus;
means for receiving a push-to-talk request;
controller means for selecting the alert tone code corresponding to the indication and transmitting the alert tone code along with a first audio message and the push-to-talk request to the remote server;
means for storing an association of the alert tone code and the apparatus in memory;
means for retrieving the stored association from memory for use with at least one subsequent transmission; and
means for transmitting the alert tone code along with a second audio message from the wireless device to the remote server based on the retrieved association.

9. A non-transitory computer-readable medium on which is stored a computer program for transmitting alert tone information between a wireless device and a server in a push-to-talk system on a wireless telecommunication network, the computer program comprising computer instructions that when executed by a computer performs the steps of:
displaying a predefined set of alert tones at the wireless device, the predefined set resident on the wireless device and each alert tone in the predefined set being identified by an alert tone code;
receiving an indication of a selected alert tone at the wireless device, the selected alert tone associated with of a user of the wireless device, wherein the indication of the selected alert tone will be transmitted from the wireless device to the server via the push-to-talk system;
selecting at the wireless device an alert tone code corresponding to the indication of the selected alert tone;
transmitting the alert tone code along with a first audio message from the wireless device to the server via a push-to-talk communication channel;
storing an association of the alert tone code and the wireless device in memory at the wireless device where the selected alert tone is selected;
retrieving the stored association from memory for use with at least one subsequent transmission; and
transmitting the alert tone code along with a second audio message from the wireless device to the server via the push-to-talk communication channel based on the retrieved association.

10. The non-transitory computer-readable medium of claim 9, further performing the steps of:
receiving an activation request for a push-to-talk session at the wireless device; and
transmitting the activation request from the wireless device to the server.

11. The non-transitory computer-readable medium of claim 9, further performing the step of receiving from the server an indication of availability of the push-to-talk communication channel.

12. A non-transitory computer-readable medium on which is stored a computer program for transmitting alert tone information of a remote wireless telecommunication device by a server in a push-to-talk system, the computer program comprising computer instructions that when executed by a computer performs the steps of:
receiving at the server a request for a push-to-talk session through a push-to-talk communication channel;

assigning at the server an alert tone code corresponding to an alert tone, the alert tone selected by the server to be associated with a sender of the request;

determining a group of intended receiving wireless telecommunication devices for the push-to-talk session;

sending an indication of the push-to-talk session to each intended receiving wireless telecommunication device in the group; and sending the alert tone code through the push-to-talk communication channel to each intended receiving wireless telecommunication device in the group.

13. The non-transitory computer-readable medium of claim 12, further performing the steps of:

determining at the server an availability of the push-to-talk communication channel; and if the push-to-talk communication channel is available, granting the push-to-talk communication channel to the remote wireless telecommunication device.

14. The non-transitory computer-readable medium of claim 12, further performing the steps of:

receiving the alert tone at the server;

storing the alert tone in an alert tone database in the server; and assigning a new alert tone set identification code to the alert tone database.

15. A server apparatus for transmitting alert tone information of a remote wireless telecommunication device in a push-to-talk system, comprising:

means for receiving at the server a request for a push-to-talk session through a push-to-talk communication channel;

means for assigning at the server an alert tone code corresponding to an alert tone, the alert tone code identifying the alert tone selected by the server to be associated with a sender of the request;

means for determining a group of intended receiving wireless telecommunication devices for the push-to-talk session;

means for sending an indication of the push-to-talk session to each intended receiving wireless telecommunication device in the group; and means for sending the alert tone code through the push-to-talk communication channel to each intended receiving wireless telecommunication device in the group.

16. A server apparatus for transmitting alert tone information of a remote wireless telecommunication device in a push-to-talk system, comprising:

a transceiver configured to receive at the server a request for a push-to-talk session through a push-to-talk communication channel; and a controller configured to assign at the server an alert tone code corresponding to an alert tone, the alert tone code identifying the alert tone selected by the server to be associated with a sender of the request, and to determine a group of intended receiving wireless telecommunication devices for the push-to-talk session, wherein the transceiver is further configured to send an indication of the push-to-talk session to each intended receiving wireless telecommunication device in the group, and to send the alert tone code through the push-to-talk communication channel to each intended receiving wireless telecommunication device in the group.

\* \* \* \* \*